United States Patent [19]

Takizawa

[11] Patent Number: 4,676,600

[45] Date of Patent: Jun. 30, 1987

[54] SOUND PREVENTING MEANS IN SLIDING LENS BARREL AND METHOD OF MANUFACTURE THEREOF

[75] Inventor: Morio Takizawa, Saitama, Japan

[73] Assignee: Asahi Kogaku Kogyo Kabushiki Kaisha, Tokyo, Japan

[21] Appl. No.: 718,123

[22] Filed: Mar. 29, 1985

[30] Foreign Application Priority Data

Mar. 30, 1984 [JP] Japan .................................. 59-63048

[51] Int. Cl.$^4$ .............................................. G02B 7/04
[52] U.S. Cl. .................................... 350/255; 350/429
[58] Field of Search ............... 350/255, 254, 257, 252, 350/253, 429; 138/104; 285/298, 302

[56] References Cited

U.S. PATENT DOCUMENTS 3,233,514  2/1966  Eberhardt ........................... 350/429
3,876,290  4/1975  Back .................................... 350/429

Primary Examiner—John K. Corbin
Assistant Examiner—Loha Ben
Attorney, Agent, or Firm—Sughrue, Mion, Zinn, Macpeak, and Seas

[57] ABSTRACT

A lens mount arrangement in which at least a pair of sliding cylindrical barrels are slidable relative to one another, which lens mount is manufactured using an inexpensive and simple process, yet the amount of sound generated during a sliding movement is significantly reduced. In accordance with an important feature of the invention, machining lead angles of the pair of sliding cylindrical surfaces are made different from each other. The lead angles may be made different in direction, or they can have the same direction but differ by at least 10° from one another.

8 Claims, 9 Drawing Figures

SOUND PREVENTING MEANS IN SLIDING LENS BARREL AND METHOD OF MANUFACTURE THEREOF

BACKGROUND OF THE INVENTION

The present invention relates to a lens mount having at least one pair of cylindrical barrels which are slidable relative to each other (as in the barrels of a zoom lens) and a "floating" lens or inner focus lens. More particularly, the invention relates to a means for preventing the generation of sound due to a sliding operation in such a lens mount.

Each of the above-described lens mounts has at least one pair of cylinders which are helicoid coupled and which slide relative to each other while being at least rotated by means of a cam for the purpose of focusing. The sliding cylindrical surfaces of these cylinders should be considerably high in surface accuracy (smoothness) in order to prevent the generation of sound or vibration during the sliding movement. If the surface accuracy is low, then an unacceptably large amount of sound can be generated. Moreover, in such a case, the cylinders tend to wear quickly to the point where the cylinders cannot slide smoothly.

In order to eliminate this difficulty, heretofore, the cylinders, after being machined on a lathe, have been subjected to honing, lapping, buffing or sandpaper finishing so that the surface accuracy thereof is improved, and the cylinders thus treated coated with a dry lubricant to obtain sliding cylindrical surfaces satisfactory in practical use. However, this conventional method is disadvantageous in that the productivity is low, the manufacturing cost is high, and it is difficult to maintain the required dimensional accuracy because it is necessary to provide machining margins for finish dimensions in the machining work and to perform additional surface processing or treating operations.

SUMMARY OF THE INVENTION

An object of the invention is thus to prevent the generation of sound produced on confronting cylindrical surfaces of a lens mount during sliding by other than improving the surface accuracy thereof.

The invention has been developed based on the finding that, since the conventional sliding cylindrical surfaces are formed by machining the cylinders with the same lead angles, microscopically, the sliding cylindrical surfaces have irregularities with the same pitch in the optical axis direction, and therefore when the cylinders slide relative to each other, the irregularities of the sliding cylindrical surfaces tend to periodically engage, causing a periodic small radial movement of the cylinders, as a result of which vibration or sound is generated.

A specific feature of the invention resides in that the machining lead angles of the sliding cylindrical surfaces are made different from each other. The term "different lead angles" as herein employed includes lead angles which are different in direction. By making the machining lead angles different as described above, fine irregularities on the sliding cylindrical surfaces cannot engage when the sliding cylindrical surfaces slide relative to each other, and accordingly the cylinder can never be moved radially and thus the generation of vibration or sound during sliding is prevented.

DESCRIPTION OF THE PREFERRED EMBODIMENTS

Figure 1:
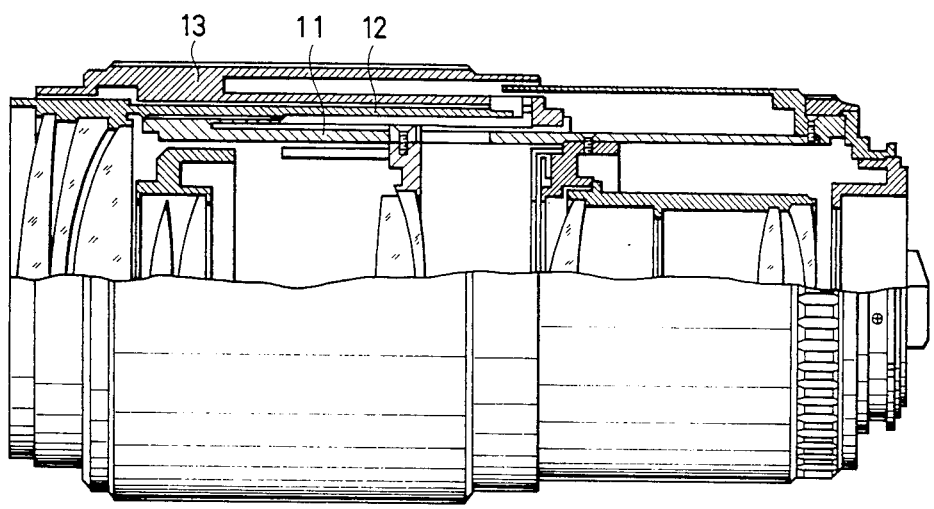
FIG. 1 is a sectional view of a four lens group type zoom lens used for a description of a lens mount to which the technical concept of this invention is applicable.

The invention will be described with reference to preferred embodiments shown in the drawings. FIG. 1 shows a four lens group type zoom lens. In FIG. 1, reference numeral 11 designates a stationary supporting cylinder, and 12, a sliding cylinder. The stationary supporting cylinder 11 is fitted in the sliding cylinder 12 holding the second group lenses (which are variator lenses). As an operating cylinder 13 is moved linearly, the sliding cylinder 12 is linearly moved on the supporting cylinder 11 while sliding.

Figure 2:
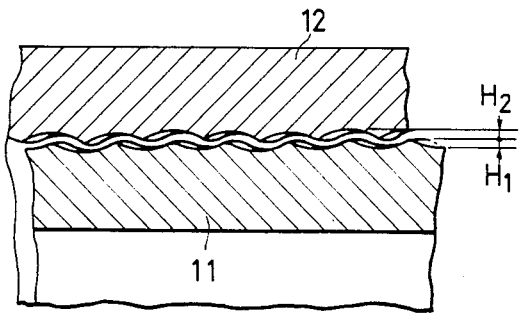
FIG. 2 is an enlarged sectional view depicting conventional sliding cylindrical surfaces.
Figure 3:
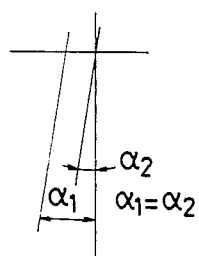
FIG. 3 is a diagram showing the relation between the machining lead angles of the sliding cylindrical surfaces in FIG. 2.

FIG. 2 is an enlarged sectional view of conventionally machined cylinder surfaces which are obtained by machining the sliding surfaces of the stationary supporting cylinder 11 and the sliding cylinder 12 with the same lead angle. FIG. 3 shows the lead angle $\alpha_1$ of the sliding cylindrical surface of the stationary supporting cylinder 11 and the lead angle $\alpha_2$ of the sliding cylindrical surface of the sliding cylinder 12, which angles are equal to each other.

It is assumed that the cylindrical surfaces are finished with ideal circularity, with ideal cylindricity, and with ideal surface accuracy. When the sliding cylinder 12 thus finished is slid on the stationary supporting cylinder 11, the former is slightly vibrated radially because of the roughness of the two sliding surfaces. This vibration generates a sound during sliding. It is considered that this vibration is attributed to the roughness of the machined sliding cylindrical surfaces, indicated by heights $H_1$ and $H_2$, when the sliding cylindrical surfaces are finished ideally as described.

Figure 4:
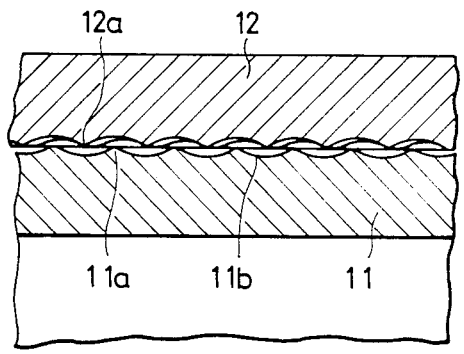
FIG. 4 is an enlarged sectional view outlining sliding cylindrical surfaces in a preferred embodiment of the invention.
Figure 5:
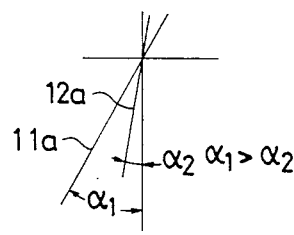
FIG. 5 is a diagram showing the relation between the machining lead angles of the sliding cylindrical surfaces in FIG. 4.

FIGS. 4 and 5 are diagrams used for a description of the principles of the invention. The machining lead angle $\alpha_1$ of the sliding cylindrical surface of the stationary supporting cylinder 11 is made larger than the lead angle $\alpha_2$ of the sliding cylindrical surface of the sliding cylinder 12 ($\alpha_1 > \alpha_2$). In FIG. 4, 11a and 12a designate the machined ridge lines of the stationary supporting cylinder 11 and the sliding cylinder 12, respectively.

Because $\alpha_1 > \alpha_2$, when the sliding cylinder 12 is slid on the stationary supporting cylinder 11, the machined ridge lines 12a of the sliding cylinder 12 can never fall into and engage with the machined troughs 11b between the machined ridge lines 11a of the stationary supporting cylinder 11; that is, the sliding cylinder 12 can smoothly slide on a "phantom" cylindrical surface defined by the machined ridge lines 11a of the stationary supporting cylinder 11. Thus, the fine surface roughness formed by machining will not cause vibration. Since the lead angle depends on the machining feed speed, if a machining tool is selected according to the machining feed speed, the lead angle can be suitably varied.

Figure 6:
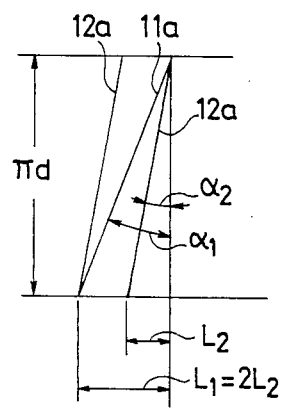
FIG. 6 is a diagram showing the relation between lead angles such that vibration can be prevented.

It is assumed that the leads of the machined surfaces of the stationary supporting cylinder 11 and the sliding cylinder 12 are represented by $L_1$ and $L_2$, respectively, and the diameter of the sliding cylindrical surfaces is represented by d. Then, as is apparent from FIG. 6, if the following condition is satisfied, the machined ridge lines 12a of the sliding cylinder 12 theoretically can never fall into the machined troughs 11b between the machined ridge lines 11a of the stationary supporting cylinder 11:

$$\alpha_1 > \tan^{-1} L_2/\pi d.$$

However, for a surface obtained by a general machining method, the machine ridge lines are in reality slightly wavy, curved, or burred, i.e., they are slightly deformed. Therefore, in the case where the difference between $\alpha_1$ and $\alpha_2$ is small, the irregularities in the circumferential direction may give rise to an audible sound during sliding movement. Accordingly, in practice, it is desirable that the difference between $\alpha_1$ and $\alpha_2$ be at least 10° when deviations from ideal conditions are taken into account. As in the case where the machining lead angles are in the same direction, the same effect can be obtained in the case also where the directions of the machining lead angles are different.

Figure 7:
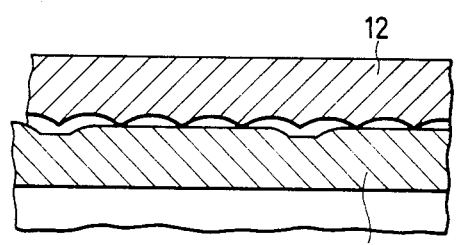
FIG. 7 is an enlarged sectional view, similar to FIG. 4, which shows another embodiment of the invention.
Figure 8:
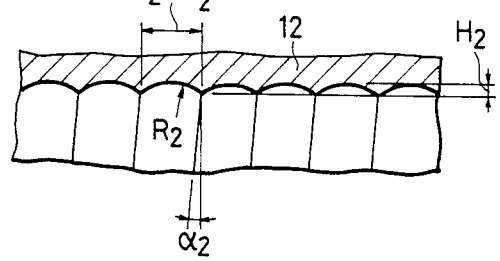
FIG. 8 is a sectional view showing only a sliding cylinder in FIG. 7.
Figure 9:
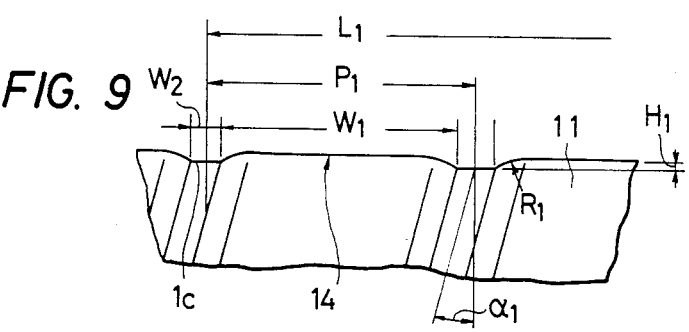
FIG. 9 is a sectional view showing only a stationary supporting cylinder in FIG. 7.

FIGS. 7 through 9 show a second embodiment of the invention. In this embodiment, one of the sliding cylindrical surfaces is a machined surface with a plurality of spiral lines. This embodiment will be described with reference to specific numerical values.

The sliding cylindrical surface of the sliding cylinder 12 is made up of a single line, as in the case of the first embodiment. The lead $L_2$ (pitch $P_2$) is 0.2 mm, the root radius (nose radius) $R_2$ is 1 mm, and the irregularity height $H_2$ is 5 microns. In FIG. 8, the lead angle $\alpha_2$ is a variable which depends on the diameter d of the sliding cylindrical surface. With d=50 mm, $\alpha_2 = \tan^{-1} L_2/\pi d = 0.073°$.

On the other hand, the sliding cylindrical surface of the stationary supporting cylinder 11 includes machined surfaces in the form of six spiral lines in a section perpendicular to the optical axis. The relevant data is as follows: machined top corner radius $R_1 = 0.5$ mm, machined groove width $W_2 = 1$ mm, irregularity height $H_1 = 0.1$ mm, and $\alpha_1 = 13°$. The lead $L_1$, the pitch $P_1$, and the machined groove width $W_1$ are variables which depend on the diameter d of the sliding cylindrical surface.

With d=50 mm,
$L_1 = \tan 13° \cdot \pi d \simeq 36.26$ mm
$P_1 = L_1/6 \simeq 6.04$ mm
$W_1 = P_1 - W_2 \simeq 5.04$ mm As is apparent from the above description, in the described embodiment, the sliding cylindrical surface of the stationary supporting cylinder 11 is made special in configuration having a width of $P_1$, and the machined top 14 is brought directly into the sliding cylindrical surface of the sliding cylinder. The machined top 14 is formed by using a forming tool having a width corresponding to the machining pitch $P_1$. In turning with the forming tool, it is desirable that a relay part corresponding to the end position of the forming tool be provided in the form of a recess on the outer wall of the stationary supporting cylinder 11 in order to prevent adverse influence from burrs (formed by the end of the forming tool) on the surface accuracy of sliding surfaces.

A machined top 14 of large width is formed as if the machined trough 11b were replaced by the machined top 14. Therefore, when the sliding cylinder 12 slides, the machined ridge lines 12a can never fall into the machined grooves 11c of the stationary supporting cylinder 11. That is, the relative surface accuracy in the sliding direction is improved, and a sufficient soundproofing effect obtained without surface treatment after the machining operation. Since the stationary supporting cylinder 11 is machined with a width $P_1$, the machining length can be reduced greatly. This is an additional advantageous effect of the invention.

The machined groove 11c of the stationary supporting cylinder 11 can be used as a lubricating groove. In this case, the cylindrical sliding surfaces can be maintained lubricated for a long period of time. It is evident that, in contrast to the above-described embodiment, a machined surface with a single spiral line is formed on the stationary supporting cylinder 11 and a machined surface with plural spiral lines is formed on the sliding cylinder 12. Furthermore, the directions of the lead angles may be changed, as described above.

As is apparent from the above description, according to the invention, in forming a pair of sliding cylindrical surfaces by machining, a simple method of making the machining lead angles different is employed to suppress the movement of the cylinders in a radial direction so as to effectively prevent the generation of noise due to vibration during sliding when the cylinders are moved radially. Especially since the cylinders can be finished merely by machining on an ordinary lathe, that is, without further processing, the machining cost and the surface treating cost can be reduced greatly. However, with the invention, further processing can, of course, be used if desired.

I claim:

1. In a lens mount having a pair of barrels with confronting sliding cylindrical surfaces which are slidable relative to each other and which are formed by machining, the improvement wherein lead angles used in machining said pair of sliding cylindrical surfaces are different from each other.

2. The lens mount as claimed in claim 1, in which said machining lead angles of said pair of sliding cylindrical surfaces are different in direction from each other.

3. The lens mount as claimed in claim 1, in which said machining lead angles of said pair of sliding cylindrical surfaces are the same in direction and differ by at least 10° from each other.

4. The lens mount as claimed in any one of claims 1, 2 and 3, in which a spiral relay part corresponding to a position of an end of a machining tool is formed, as a recess unrelated to sliding surfaces, on a one of said sliding cylindrical surfaces which is larger in lead angle.

5. The lens mount as claimed in claim 4, wherein said machining tool is forming tool.

6. A method of forming a lens mount having a pair of barrels with confronting sliding cylindrical surfaces which are slidable relative to each other, said method comprising:

machining one of said confronting cylindrical surfaces at a first machining lead angle; and machining the other of said confronting cylindrical surfaces at a second machining lead angle, different from said first machining lead angle.

7. A method as claimed in claim 6, wherein said second machining step comprises the step of machining the other of said confronting cylindrical surfaces at a second machining lead angle, different in direction from said first machining lead angle.

8. A method as claimed in claim 6, wherein said second machining step comprises the step of machining the other of said confronting cylindrical surfaces at a second machining lead angle, in the same direction as said first machining lead angle, and different by at least 10° from said first machining lead angle.

* * * * *